Jan. 6, 1925.

H. W. GOODALL

HOSE CLAMP

Filed Jan. 19, 1923

1,522,013

WITNESS:
Rob. P. Kitchel.

INVENTOR
Howard W. Goodall
BY
Augustus B Stoughton
ATTORNEY.

Patented Jan. 6, 1925.

1,522,013

UNITED STATES PATENT OFFICE.

HOWARD W. GOODALL, OF ALDAN, PENNSYLVANIA.

HOSE CLAMP.

Application filed January 19, 1923. Serial No. 613,571.

*To all whom it may concern:*

Be it known that I, HOWARD W. GOODALL, a citizen of the United States, residing at Aldan, in the county of Delaware and State of Pennsylvania, have invented a new and useful Improvement in Hose Clamps, of which the following is a specification.

Objects of the present invention are to reduce the power or exertion required for the application of the clamp; to facilitate and quicken the application of the hose clamp to the hose; to avoid injury to the hose in the application of the clamp; to counteract the tendency of the clamping bolts to bend the ears; to lighten and therefore reduce the cost of the clamp without sacrifice of strength; to increase the range of sizes, undersize and oversize, of hose to which a clamp of standard size can be applied; and to provide a simple, efficient and reliable hose clamp.

The invention comprises the improvements to be presently described and finally claimed.

A description will be given of a hose clamp embodying features of the invention in connection with the accompanying drawings which illustrate one but not the only embodiment of the invention, and in the drawings forming part hereof Figure 1 is a face view with parts broken away of a hose clamp embodying features of the invention.

Figure 2:
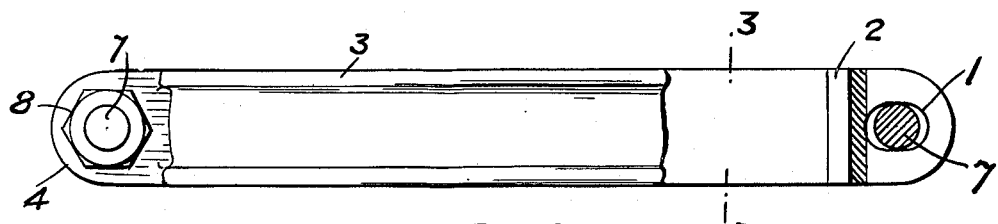
Fig. 2 is an edge view of the same with parts broken away on the line 2—2 of Figure 1.
Figure 3:
Fig. 3 is a sectional view drawn to an enlarged scale and taken on the line 3—3 of Fig. 2.
Figure 4:
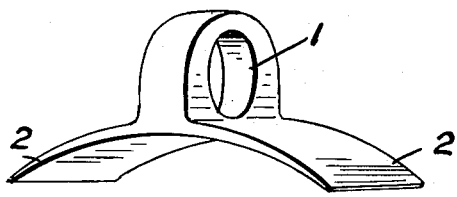
Fig. 4 is a perspective view of one of the saddles.

There are arcuate saddles or fillets, Fig. 4, each provided with a bolt eye or way 1 arranged between the ends 2 thereof. The saddle is shown to taper from the eye 1 toward each end. 3 are ring sections or segments of rings and they are provided with ears 4 having bolt-holes or ways 5 therein. The inner surface of the ends of the ring sections 3 are shown to taper outwardly as at 6 in conformity with the taper on the ends 2 of the saddles. 7 are bolts which have nuts 8 and, as shown, they are afforded some play in the eyes 1, Fig. 2. It may be remarked that the bolt-holes 5 are axially arranged on a tangent at substantially the axis of the eye 1 which is quite within the periphery of the clamp and in this way the pull of the bolt falls fairly within the periphery of the clamp so that tendency to bend the ears 4 is minimized while at the same time sufficient room is provided for the bolt heads and nuts and for the tool that may be applied to them.

Figure 1:
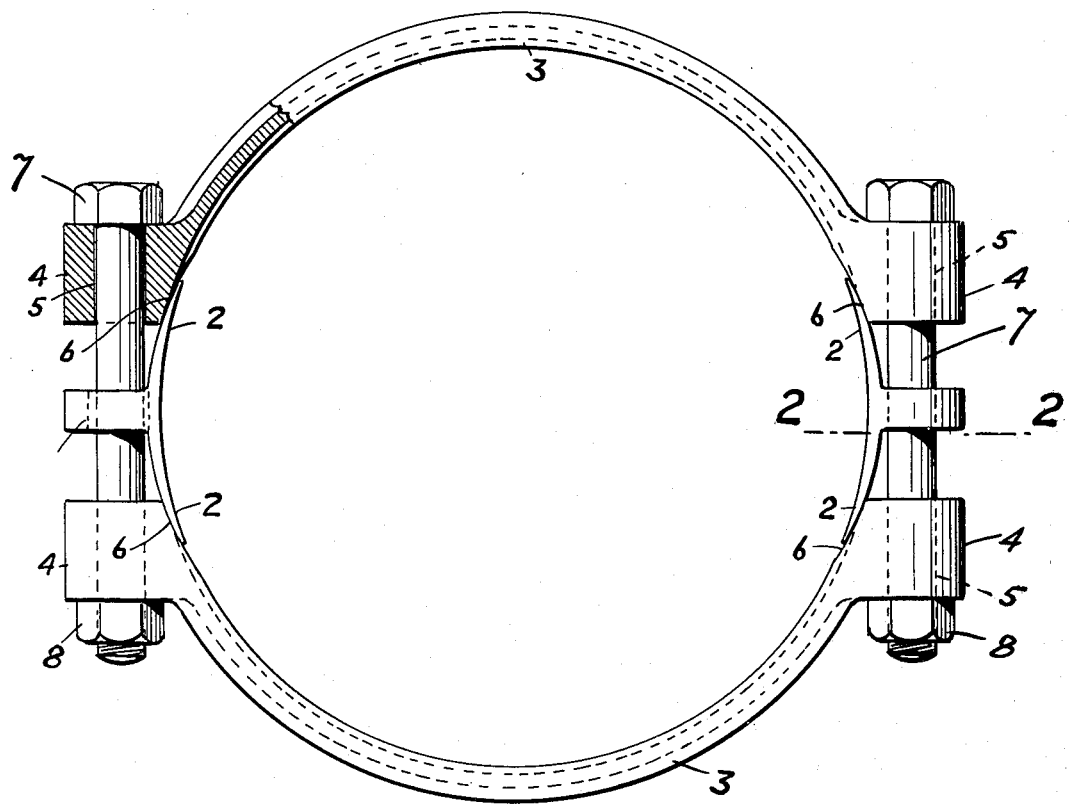

With the parts assembled, as shown in Fig. 1, and with the clamp externally applied to a hose within which is a coupling element or part to which the hose is to be clamped, the mode of operation may be described as follows:

When the bolts are drawn up the ends of the ring sections slide on the ends of the saddles and the saddles remain substantially at rest on the surface of the hose. The surface of the hose is not cut or marked and comparatively little power is required to draw up the bolts in such a way as to make the clamp very tight on the hose. Moreover the operation can be quickly accomplished and, as has been said, there is little tendency to bend the ears. It has been said that comparatively little metal is required and that is due to the fact, among other things, that the ears may be relatively small and light, and the ears may be small and light because they do not have to be long to provide space for the bolt heads and nuts or massive to resist bending moment.

There may be more than two ring sections or segments with a corresponding increase of saddles and bolts and there may be but one ring section with the omission of one of the saddles and bolts. In such case the ring section is continuous, for example, at the left in Fig. 1, and of course the saddles and bolts at the left in Figure 1 would be omitted. In such case the single saddle and bolt as at the right in Fig. 1 would be detached and the split ring sprung onto the hose and then the saddle with its bolt and nut replaced and used to clamp the split ring.

It will be obvious to those skilled in the art to which the invention relates that modifications may be made in details of construction and arrangement and in mere matters of form so that the invention is not limited in those regards or otherwise than as the prior art and the appended claims may require.

I claim:

1. A hose clamp including ring sections and arcuate saddles overlapping at the ends thereof and together providing an inner surface of the form of a circle, bolts for drawing the ends of the ring sections together and for thereby forcing the saddles radially inwards to position the inner faces thereof inside of the circumference of said circle, and eyes provided on the saddles and spaced from the adjacent ends of the ring sections to permit of the described approach of said ends, and said eyes formed to permit of radial movement of the saddles.

2. A circular hose clamp including a split ring and a saddle of which the inner surfaces normally coincide with the inner circle of the clamp, the saddle being radially free for movement of its inner surface inside of that circle, the ring ends being beveled and overlapping the saddle ends which are provided with beveled surfaces longer than the beveled surfaces on the ring ends, and means for drawing the ring ends together to cause their beveled portions, riding on the saddle beveled portions, to wedge the saddle radially inwards.

HOWARD W. GOODALL.